United States Patent
Brown et al.

(10) Patent No.: US 8,628,891 B2
(45) Date of Patent: Jan. 14, 2014

(54) INTERCONNECTION OF BUNDLED SOLID OXIDE FUEL CELLS

(75) Inventors: Michael Brown, Cambridge, MA (US); Norman F. Bessette, II, Middleboro, MA (US); Anthony F. Litka, Hanover, MA (US); Douglas S. Schmidt, Walpole, MA (US)

(73) Assignee: Acumentrics Corporation, Westwood, MA (US)

( * ) Notice: Subject to any disclaimer, the term of this patent is extended or adjusted under 35 U.S.C. 154(b) by 592 days.

(21) Appl. No.: 11/639,361

(22) Filed: Dec. 14, 2006

(65) Prior Publication Data
US 2007/0148523 A1    Jun. 28, 2007

Related U.S. Application Data

(60) Provisional application No. 60/750,569, filed on Dec. 15, 2005.

(51) Int. Cl.
*H01M 8/12*   (2006.01)
*H01M 8/02*   (2006.01)

(52) U.S. Cl.
USPC ............ 429/466; 429/469; 429/510; 429/517

(58) Field of Classification Search
USPC .............................. 429/31, 466, 469, 510, 517
See application file for complete search history.

(56) References Cited

U.S. PATENT DOCUMENTS

| | | | |
|---|---|---|---|
| 4,490,444 A | 12/1984 | Isenberg | |
| 4,728,584 A * | 3/1988 | Isenberg | 429/456 |
| 4,791,035 A * | 12/1988 | Reichner | 429/456 |
| 6,358,640 B1 | 3/2002 | Kendall et al. | 429/26 |
| D462,050 S | 8/2002 | Smith et al. | D13/101 |
| 6,492,050 B1 | 12/2002 | Sammes | 429/31 |
| 6,696,187 B2 | 2/2004 | Kendall et al. | 429/13 |
| 6,841,284 B2 | 1/2005 | Brown et al. | 429/31 |
| 6,936,367 B2 * | 8/2005 | Sarkar et al. | 429/31 |
| 2003/0203263 A1 | 10/2003 | Brown et al. | |

(Continued)

FOREIGN PATENT DOCUMENTS

| | | |
|---|---|---|
| CA | 1285018 | 6/1991 |
| EP | 0 907 978 | 4/1999 |

(Continued)

OTHER PUBLICATIONS

Definition of "discrete" as defined by thefreedictionary.com.*

(Continued)

*Primary Examiner* — Gregg Cantelmo
(74) *Attorney, Agent, or Firm* — Preti Flaherty Beliveau & Pachios LLP

(57) ABSTRACT

A system and method for electrically interconnecting a plurality of fuel cells to provide dense packing of the fuel cells. Each one of a plurality of fuel cells has a plurality of discrete electrical connection points along an outer surface. Electrical connections are made directly between the discrete electrical connection points of adjacent fuel cells so that the fuel cells can be packed more densely. Fuel cells have at least one outer electrode and at least one discrete interconnection to an inner electrode, wherein the outer electrode is one of a cathode and an anode and wherein the inner electrode is the other of the cathode and the anode. In tubular solid oxide fuel cells the discrete electrical connection points are spaced along the length of the fuel cell.

27 Claims, 10 Drawing Sheets

(56) References Cited

U.S. PATENT DOCUMENTS

| | | | |
|---|---|---|---|
| 2004/0234830 A1* | 11/2004 | Draper et al. | 429/30 |
| 2005/0019636 A1 | 1/2005 | Kwon et al. | 429/32 |
| 2005/0037252 A1 | 2/2005 | Pham | 429/31 |
| 2005/0053819 A1 | 3/2005 | Paz | 429/32 |
| 2005/0095483 A1 | 5/2005 | Song et al. | 429/31 |
| 2005/0147857 A1* | 7/2005 | Crumm et al. | 429/31 |
| 2005/0196657 A1 | 9/2005 | Sarkar et al. | |
| 2005/0208355 A1 | 9/2005 | Kaga | 429/31 |
| 2005/0214613 A1 | 9/2005 | Sarkar et al. | 429/31 |

FOREIGN PATENT DOCUMENTS

| | | |
|---|---|---|
| EP | 1 304 755 | 4/2003 |
| JP | 7-211334 | 8/1995 |
| WO | WO 97/48144 | 12/1997 |
| WO | WO 99/17390 | 4/1999 |
| WO | WO 02/099917 | 12/2002 |
| WO | WO 03/071624 | 8/2003 |
| WO | WO 2005/091417 | 9/2005 |
| WO | WO 2006/017777 | 2/2006 |

OTHER PUBLICATIONS

"Siemens Power Generation: Fuel Cells", http://www.powergeneration.siemens.com/en/fuelcells, at least as early as 2006, 15 pages.

EG&G Technical Services, Inc., Science Applications International Corporation, "Fuel Cell Handbook (Sixth Edition)", Under Contract No. DE-AM26-99FT40575, U.S. Department of Energy, Office of Fossil Energy, National Energy Technology Laboratory, 2002, 107 pages.

* cited by examiner

INTERCONNECTION OF BUNDLED SOLID OXIDE FUEL CELLS

CROSS REFERENCE TO RELATED APPLICATIONS

This application claims the benefit of provisional patent application No. 60/750,569 filed on Dec. 15, 2005.

STATEMENT REGARDING FEDERALLY SPONSORED RESEARCH OR DEVELOPMENT

This invention was made with Government support under DE-FC26-03NT41838 awarded by the U.S. Department of Energy. The Government has certain rights in this invention.

FIELD OF THE INVENTION

The present invention relates generally to solid oxide fuel cells, and, more particularly, to the electrical interconnection of solid oxide fuel cells.

BACKGROUND

Tubular solid oxide fuel cells (SOFCs) represent a significant advantage over planar-type SOFCs due to enhanced gas collection capability, ease of manufacture, and strength of the tubular design. Anode supported tubular SOFCs possess additional advantages over cathode or electrolyte supported cells due to lower cost, greater strength, and more intimate relationship with the critical gas component, i.e., the fuel. With this capture of the fuel, they also inherently have the ability to perform on-cell reformation of fuels rather than require external reforming equipment.

FIG. 1 is a cross-sectional view of a typical anode-supported tubular SOFC as known in the art. Generally speaking, an anode-supported tubular SOFC has a hollow, tubular inner anode layer 102, an electrolyte layer 104 formed on a portion of the outside of the anode layer 102, and a cathode layer 106 formed on a portion of the electrolyte layer. Current flows radially from the inside to the outside along the length of the tube.

As shown in FIG. 2, current collection in anode-supported tubular SOFCs typically involves anodic electrical take-off connections 202 and cathodic electrical take-off connections 206 located at one end of the tubular fuel cell adjacent a fuel input 220. This arrangement allows mechanical ease of assembly, utilizing the gas distribution manifolds as current collection devices. For current collection, wires must be run between the manifold and the cathode and/or anode. Due to separation and connection constraints, the manifold must be designed to allow for sufficient spacing to accommodate these connections, resulting in a relatively large system. Additionally, this arrangement generally results in large electrical power losses, proportional to the length and thickness of the anode supported fuel cell.

One drawback of the current collection arrangement shown in FIG. 2 is that the current needs to travel along the entire length of the tube. This can result in major power losses. FIG. 3 shows a representation of current decreasing as a function of increasing tube length for an anode-supported tubular SOFC having anodic and cathodic current collectors at one end of the fuel cell. It is therefore desirable to reduce or minimize these losses to enhance cell performance and lower fuel cell costs.

Siemens Westinghouse describes the use of a single strip down the length of a cathode supported fuel cell, allowing current collection along the length, with only circumferential losses, although due to the design of their cathode-supported fuel cell, significant non-uniform circumferential stresses can be formed. With such a design, improved current collection is generally realized at the expense of a more complicated system design and greater variability in the packing of the tubular fuel cells.

SUMMARY OF THE INVENTION

A system and method for interconnecting bundled solid oxide fuel cells is disclosed. Each one of a plurality of fuel cells has a plurality of discrete electrical connection points along an outer surface. Electrical connections are made directly between the discrete electrical connection points of adjacent fuel cells so that a manifold does not need to be used in current collection and the fuel cells can be packed more densely. In this way, the manifold is not constrained by electrical requirements and therefore can be redesigned to improve fuel cell density.

Each fuel cell may include at least one outer electrode and at least one discrete interconnection to an inner electrode, wherein the outer electrode is one of a cathode and an anode and wherein the inner electrode is the other of the cathode and the anode.

The system may also include a current collector configured to directly connect electrical connection points of adjacent fuel cells, and bridge connection points of the fuel cell on which it is located while not shorting the cathode to the anode for any individual fuel cell.

Fuel cells may be aligned such that the cathode connection points of adjacent fuel cells are side-by-side and such that the anode connection points of adjacent fuel cells are side-by-side. Alternatively, fuel cells or the manufactured connections on the fuel cells may be staggered such that the cathode connection points of one fuel cell are side-by-side with the anode connection points of an adjacent fuel cell. The former configuration can be easily used to form serial or parallel electrical connections. The latter configuration is particularly useful for forming serial electrical connections, but can also be used to form parallel connections. In addition, these discrete connections provide for high-density packaging of fuel cells without hindering air flow between cells, as would a single connection running along the entire length of the cell (e.g., the Siemens Westinghouse connection type).

In accordance with another aspect of the invention there is provided a method of producing a fuel cell bundle. The method comprises coupling a plurality of fuel cells to a manifold, and electrically interconnecting each fuel cell directly to at least one adjacent fuel cell so that the manifold is not required for electrical connectivity.

BRIEF DESCRIPTION OF THE DRAWINGS

The foregoing and advantages of the invention will be appreciated more fully from the following further description thereof with reference to the accompanying drawings wherein.

DETAILED DESCRIPTION

U.S. provisional patent application No. 60/750,569 filed on Dec. 15, 2005 is incorporated by reference herein in its entirety.

Embodiments of the present invention use multiple electrical connection points along the outer surfaces of the fuel cells to make electrical connections directly between fuel cells so that the manifold does not need to be used in current collection. Among other things, such direct electrical connections allow multiple fuel cells to be closely packed, in part because the manifold design is not constrained by electrical requirements. By closely packing fuel cells, certain advantages, such as reduced size/volume (and therefore increased power/volume ratio), reduced weight (e.g., due to reduction in manifold and other materials), improved electrical efficiency (e.g., reduced resistance losses, reduced electrical losses between fuel cells, reduced voltage/current variability), improved thermal efficiency (e.g., lower thermal losses), ease of manufacture (e.g., the ability to connect fuel cells with serial and/or parallel electrical connections to achieve specific overall power requirements), and modularity (e.g., the ability to easily interconnect multiple bundles), can be realized.

Exemplary embodiments are described herein with reference to tubular anode-supported SOFCs having an inner anode, an intermediate electrolyte layer, and an outer cathode layer, although it should be understood that various aspects of the invention can apply to other types of anode-supported SOFCs (e.g., non-tubular) as well as other types of fuel cells that are not anode-supported.

Figure 1:
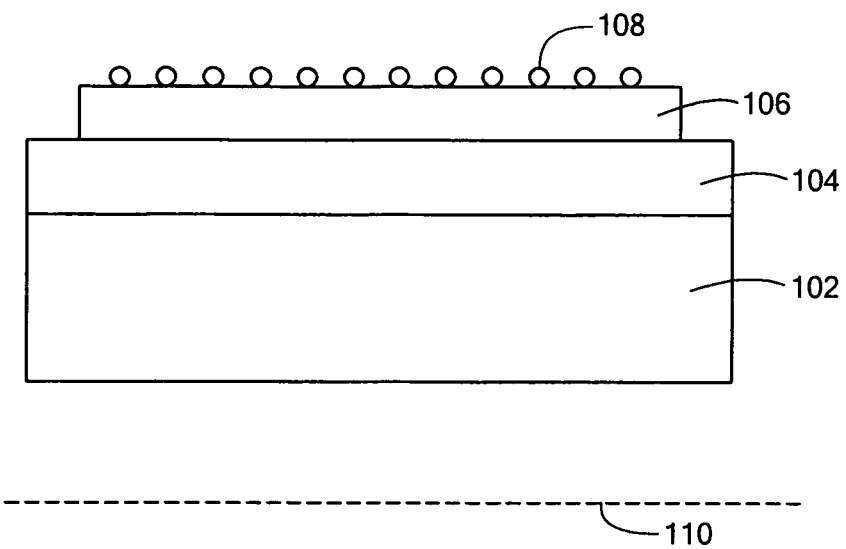
FIG. 1 is a cross-sectional view of a typical anode-supported tubular SOFC as known in the art.
Figure 2:
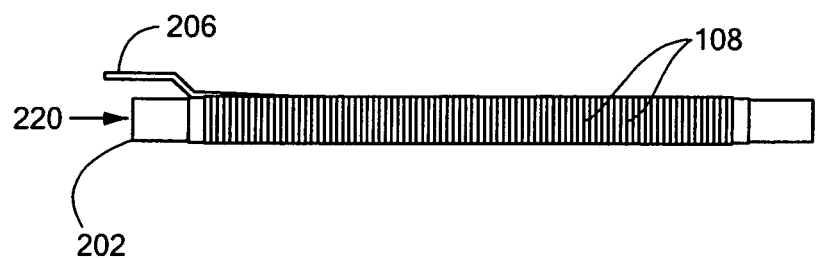
FIG. 2 shows a representation of a standard anode-supported tubular solid oxide fuel cell having anodic and cathodic current collectors at one end of the fuel cell as known in the art.
Figure 3:
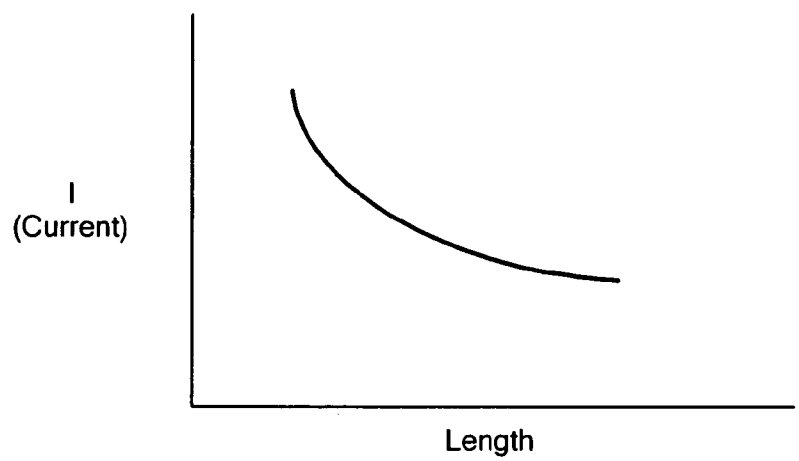
FIG. 3 shows a representation of current decreasing as a function of increasing tube length for an anode-supported tubular SOFC having anodic and cathodic current collectors at one end of the fuel cell, as shown in FIG. 2.
Figure 4:
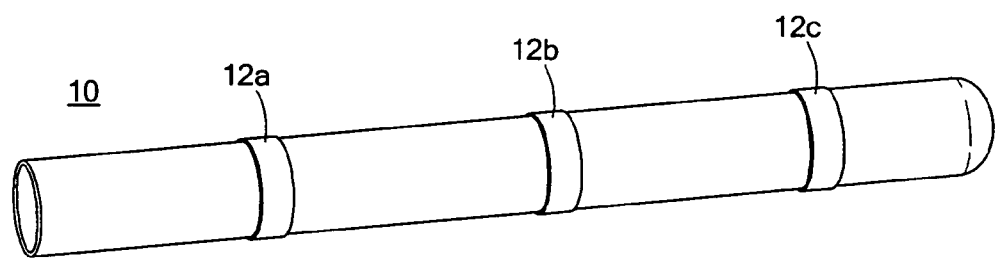
FIG. 4 is a schematic of a tubular fuel cell with three electrical connection points.

In accordance with certain embodiments of the present invention, each anode-supported fuel cell may have multiple cathode and anode electrical connection points along the outer surface of the fuel cell, with the cathode being directly accessible for electrical connectivity by virtue of the cathode being the outer layer of the fuel cell, and with the anode being indirectly accessible for electrical connectivity, e.g., through an interconnection along the outer surface that is electrically coupled with the inner anode. As shown in FIG. 4, fuel cell 10 includes interconnections 12a, 12b, 12c accessible from one side of the fuel cell so as to allow relatively easy access to both the cathode and anode, although it should be noted that fuel cell 10 may have a greater or fewer number of interconnections. In addition, the interconnections are typically constructed and placed in such a manner as to improve electrochemical and manufacturing efficiency. A tubular shape is used in the exemplary embodiments described, but other shapes (triangles, squares, etc) may be utilized in a similar manner.

Serial and/or parallel electrical connections can be made between adjacent fuel cells by making electrical connections between the cathode and anode electrical connection points on one fuel cell and the cathode and anode electrical connection points on an adjacent fuel cell. In a serial connection, the cathode of one fuel cell is electrically connected to the anode interconnection of the adjacent fuel cell. In a parallel connection, the cathodes of adjacent fuel cells are connected to one another, and/or the anodes of the adjacent fuel cells are connected to one another.

Figure 5:
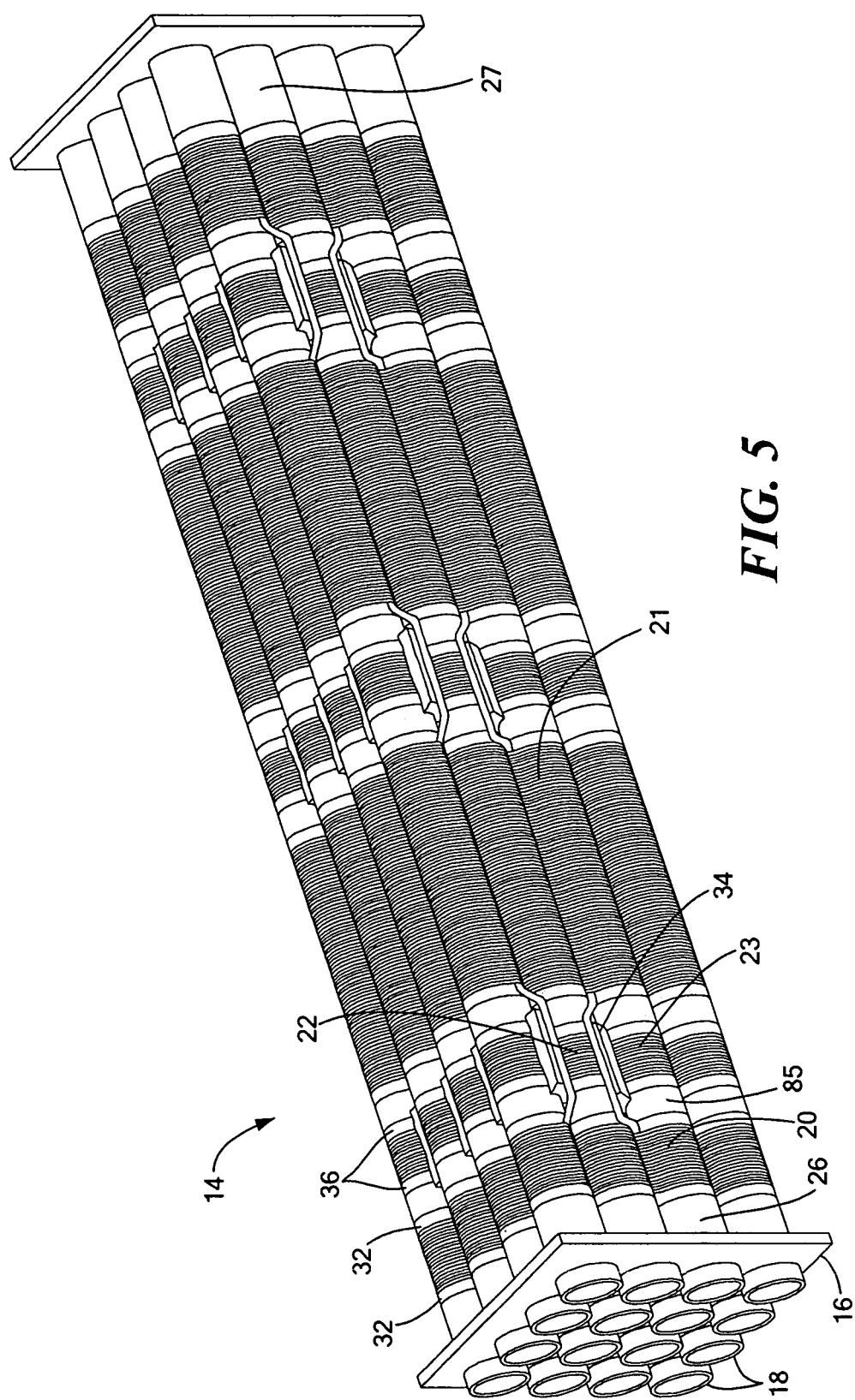
FIG. 5 shows a 4×4 fuel cell bundle.

FIG. 5 shows a fuel cell bundle 14 in accordance with an exemplary embodiment of the present invention. Fuel is distributed to fuel cells 18, which cells can be coupled to a manifold (not shown), specifically by allowing fuel to flow through the tubular anode. However, unlike prior art systems, connections from the cathode and anode are not returned to a manifold, such as, for example, the cell-holding manifold 16. Rather, discrete connections are made directly between adjacent fuel cells, as discussed in greater detail below. In this way, the manifold is not constrained by electrical requirements and therefore can be redesigned to improve fuel cell density.

In particular, FIG. 5 shows a serial connection between adjacent fuel cells 26 and 27. Specifically, a current collector 24 (e.g., a wire) extends from cathode 20 of fuel cell 26 to cathode 21 of fuel cell 26, but is raised above (i.e., bridged across) interconnection 23 of fuel cell 26 so that the wire does not contact interconnection 23. As discussed below, an insulator 34 may be placed between the interconnection 23 and the current collector 24. At the bridge point, the current collector 24 is coupled to interconnection 22 of adjacent fuel cell 27. In this way, the cathode of fuel cell 26 is connected in series with the anode of adjacent fuel cell 27.

As shown on FIG. 5, wire or braid (24) may be disposed adjacent YSZ (electrolyte) and wrapped with highly conductive windings, such as a silver wire winding, to create a cathode connection. The wire or braid 24 may extend along the length of the fuel cell and be disposed under a winding of another cathode portion so as to form a singular cathode current collector. Alternatively, the wire or braids disposed under the cathode connection windings may terminate in a pigtail so as to allow flexibility for connection to similar pigtails disposed under cathode connection windings of the same fuel cell or for connection to cathode or anode pigtails on an adjacent fuel cell based on a desired fuel cell interconnection arrangement.

Figure 6:
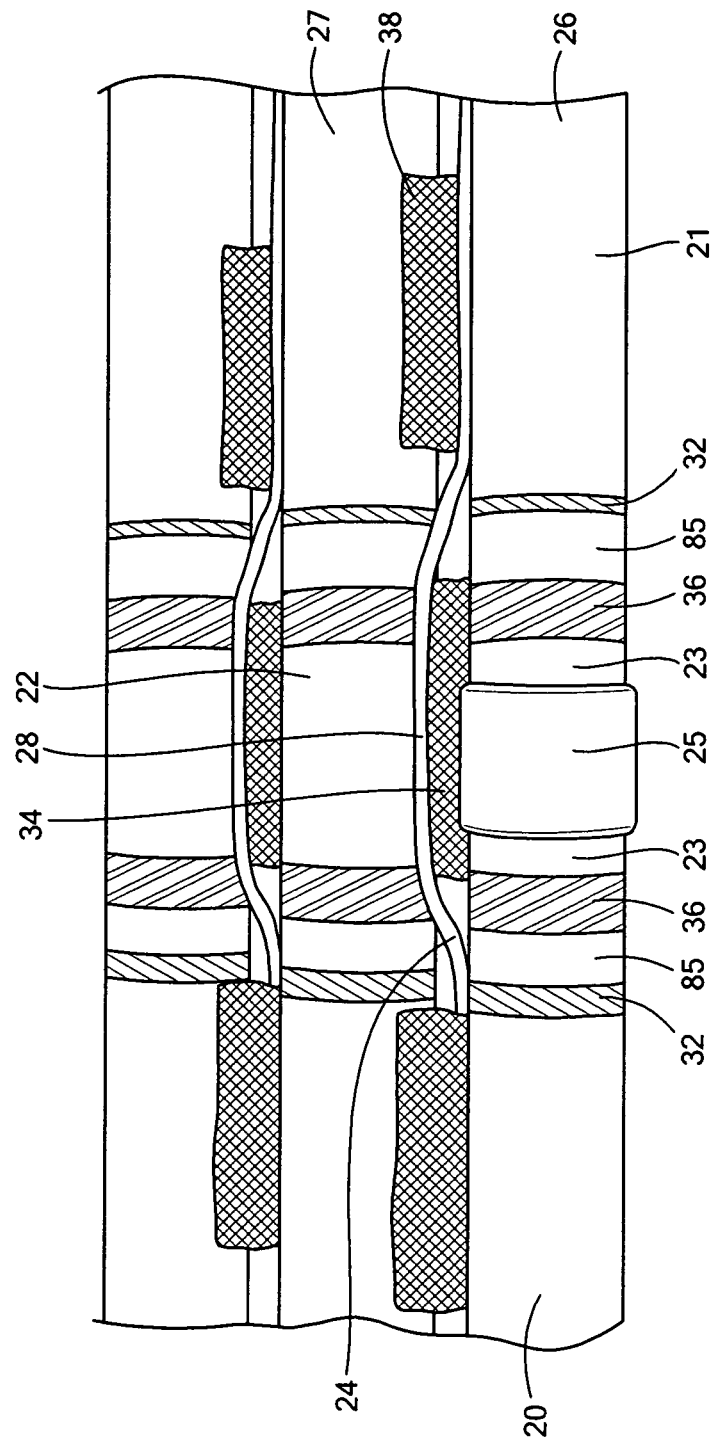
FIG. 6 shows a close up of a serial connection between two adjacent fuel cells.

FIG. 6 shows greater detail of a serial connection 28 of the type described above with reference to FIG. 5. Specifically, current collector 24 (e.g., a wire) is attached to cathode 20 of fuel cell 26 and to cathode 21 of fuel cell 26, and may run along substantially the entire length of fuel cell 26. At each interconnection 23, the current collector 24 is detached from the fuel cell 26 so that it bridges the interconnection 23 of fuel cell 26. An insulation layer 34 may be placed between current collector 24 and the interconnection 23 to prevent electrical contact between the two and, thus, to prevent shorting. A serial connection is made by connection of the bridged portion of current collector 24 with interconnection 22 of adjacent fuel cell 27. FIG. 6 also shows an interconnection clip 25. Interconnection 23 comprises an interconnection material 36 that contacts the underlying, inner anode around which is placed a conductor layer, which can be, for example, thin wire-wrap or contact paste, or any other suitable contact material known in the art. Similarly, cathode regions 20 and 21 comprise a cathode material 32 that covers a portion of the electrolyte. An uncovered electrolyte gap 85 is shown in FIG. 6, separating the cathode and interconnection regions. The electrolyte layer is discontinuous where the interconnection material contacts the anode layer.

Figure 13A:
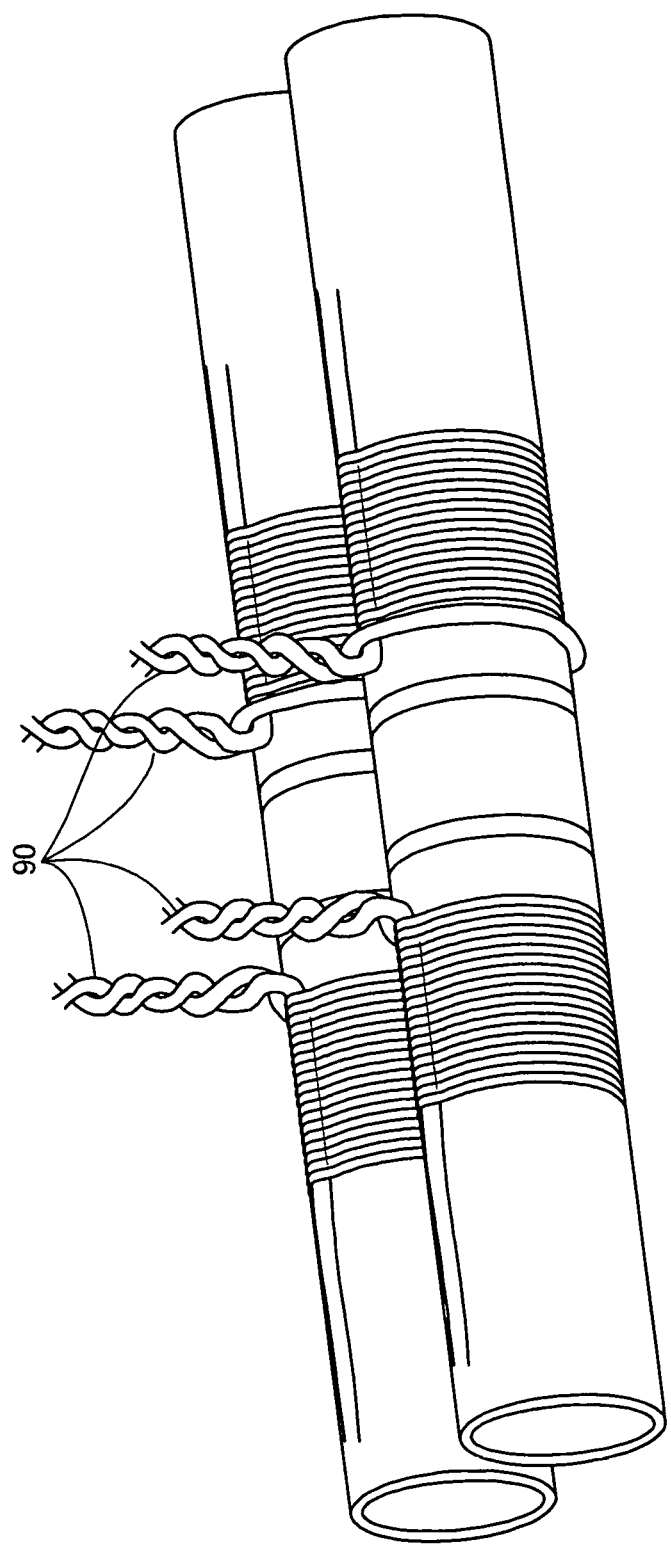
FIG. 13A shows fuel cells with a current collector connecting from the cathode at substantially a 90° angle from the fuel cells.
Figure 13B:
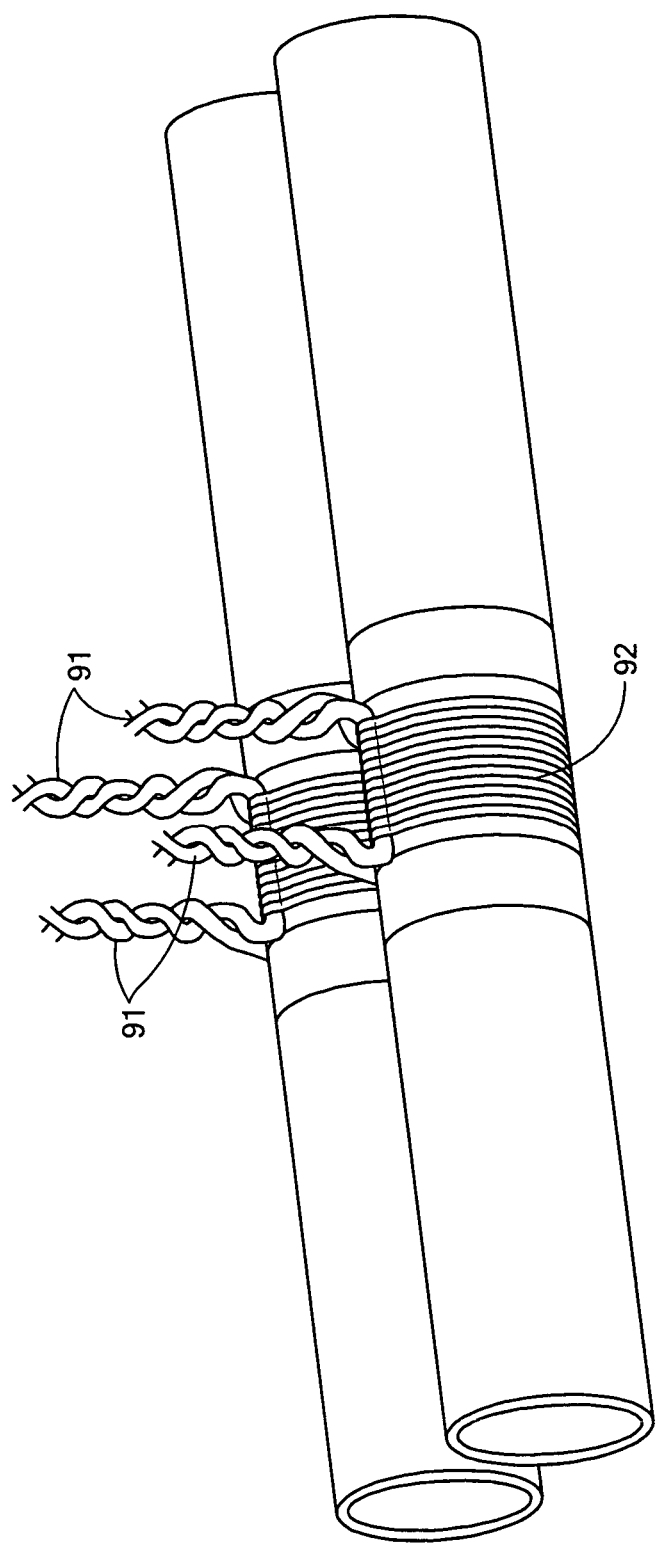
FIG. 13B shows fuel cells with a current collector connecting from the anode interconnection at substantially a 90° angle from the fuel cells.

While FIG. 5 and FIG. 6 depict a current collector in the form of a wire that is bridged between two cathode segments over an anode interconnection, it should be understood that the present invention is not limited to this embodiment. Rather, many other types of electrical connections can be made. For example, FIG. 13A and FIG. 13B show wire "pigtails" that are preformed on the cathodes and anode interconnections, respectively, and then coupled as needed. FIG. 13A shows wire pigtails 90 formed on the cathodes. FIG. 13B shows wire pigtails 91 formed on the anode interconnections. These pigtails can be interconnected to form serial and/or parallel connections between fuel cells. For example, in order to form a serial connection, the cathode pigtails 90 on one fuel cell can be coupled to the anode pigtails 91 of an adjacent fuel cell, for example, by crimping, twisting, clip, wire, foam, or other means known in the art. In order to form a parallel connection, the cathode pigtails 90 of adjacent fuel cells can be coupled to one another, while the anode pigtails 91 of adjacent fuel cells can be coupled to one another, for example, by crimping, twisting, clip, wire, foam, or other means known in the art.

Figure 8:
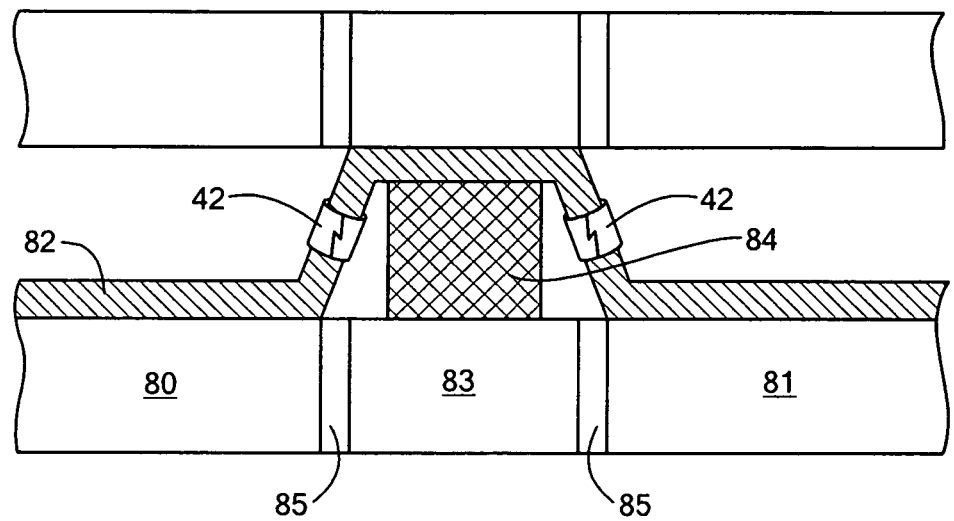
FIG. 8 shows a serial connection using a crimp connection.
Figure 9:
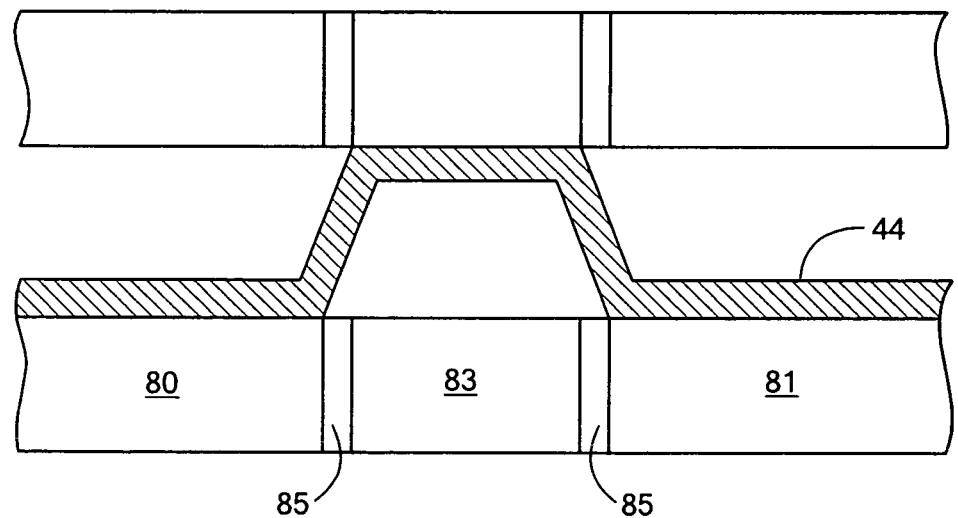
FIG. 9 shows a serial connection using a ceramic or metallic form.
Figure 10:
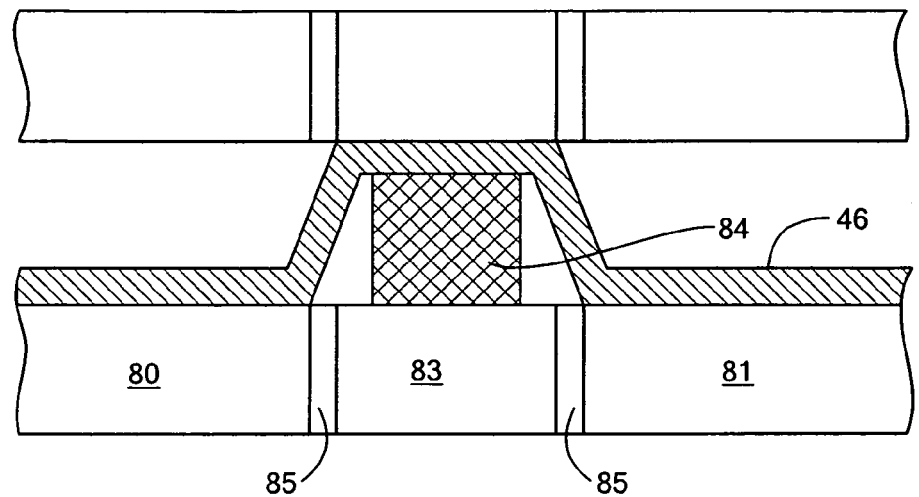
FIG. 10 shows a serial connection using wire.
Figure 11:
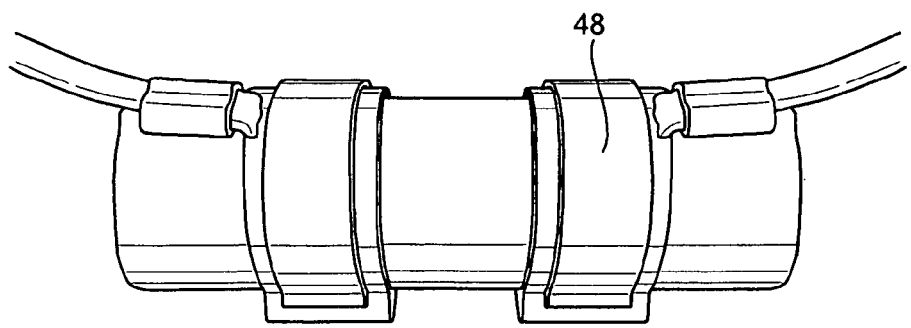
FIG. 11 shows prefabricated wire and clip segments.

Thus, current collector 24 can be made from a variety of materials including, but not limited to, Ag, Au, Pt, Pdt coated metals, or conductive ceramics. Interconnections can be formed of a ceria-based, Fe-based, Cr-based or other gas-tight, dual-atmosphere ceramic conductor, such as, for example $LaCrO_3$. Interconnection-to-interconnection, cathode-to-cathode, and interconnection-to-cathode connections can be made by, for example, the following: crimp 40 (for example, as shown in FIG. 7); clip 42 (for example, as shown in FIG. 8, wherein current collecting wire 82 adjacent cathode 80 of a first fuel cell is connected to a similar wire collecting current from another cathode 81 on the same cell, these wires being joined by clip 42 to a bridging wire that connects to the interconnection of a second adjacent fuel cell, where gaps 85 separate the interconnection from nearby cathode on each cell and where an optional insulator 84 can be positioned between the bridging wire and interconnection 83 of the same first cell); ceramic or metallic form 44 (for example, as depicted in FIG. 9, where cathodes 80 and 81 are connected by the form 44 that connects to the interconnection of a second adjacent fuel cell, where gaps 85 and interconnection 83 are as described in FIG. 9); metallic wire 46 (for example, as depicted in FIG. 10, wherein cathodes 80 and 81 are electrically connected by wire 46 that connects to the interconnection of a second adjacent fuel cell, where gaps 85, insulator 84 and interconnection 83 are as described in FIG. 9); prefabricated wire/clip segments 48 (for example, as depicted in FIG. 11); or combinations thereof.

Figure 7:
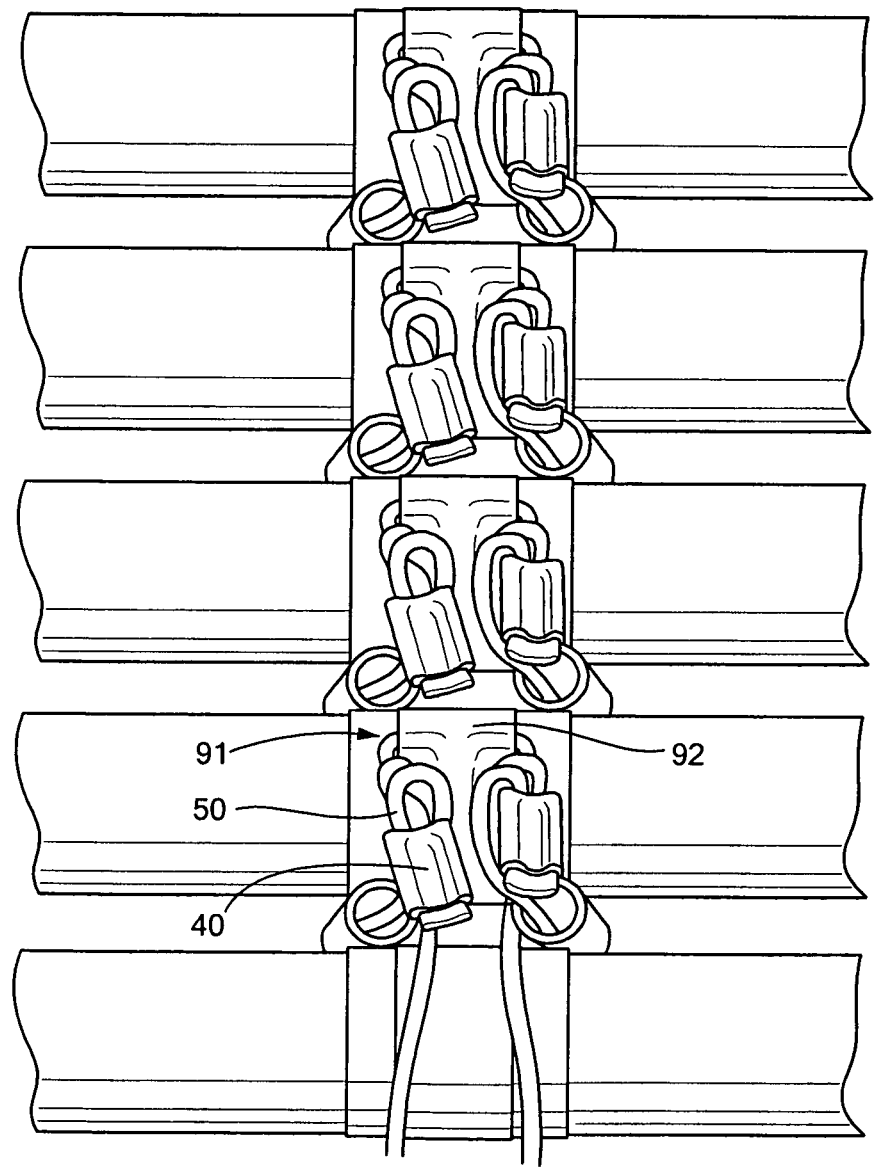
FIG. 7 shows a parallel connection using crimps or a welded joint.

FIG. 7 shows parallel electrical connections using crimped wire pigtails 50, in accordance with an exemplary embodiment of the present invention. Also shown in FIG. 7 (and in FIG. 13B), a wire or braid 91 can be disposed under an interconnection winding, interconnection chip or other electrically contacting means 92. The wire or braid can extend outboard of the winding to form pigtail in the manner discussed above to enable interconnection with other anode interconnection portions on the same fuel cell or to enable interconnection with other anode or cathode interconnection portions on one or more adjacent cells based on a desired fuel cell interconnection arrangement.

Figure 12:
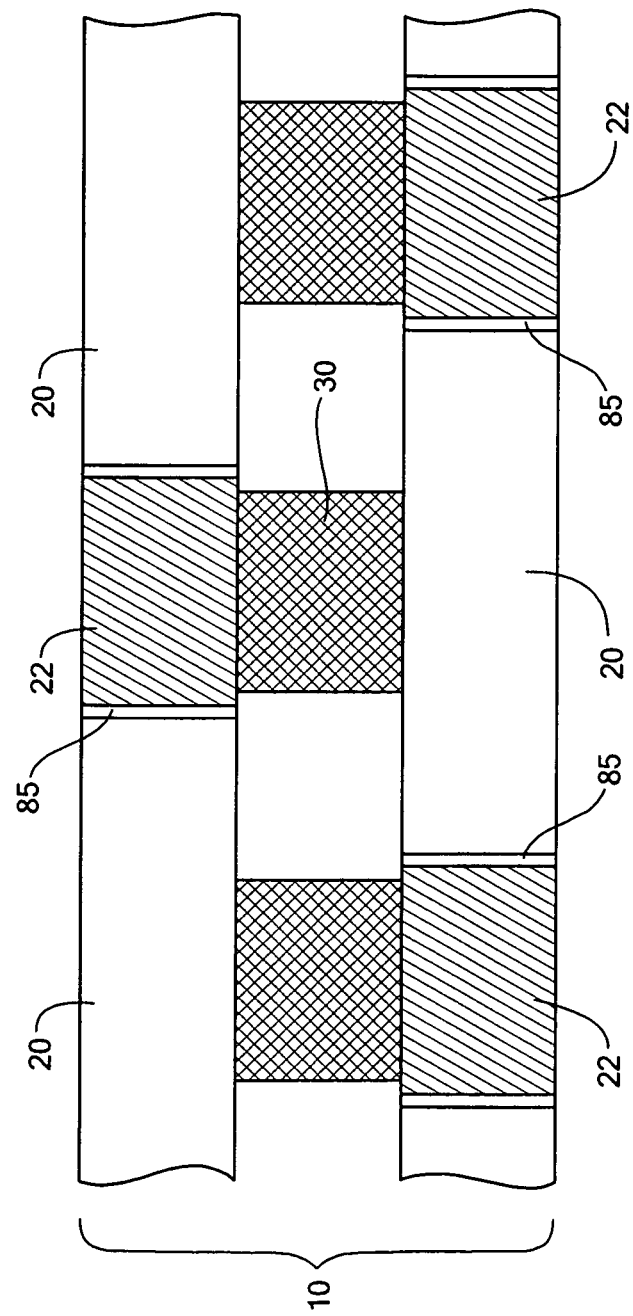
FIG. 12 shows serial connections when the interconnection points on adjacent fuel cells are staggered.

In the exemplary embodiments shown and described above with reference to FIGS. 5-10, electrical interconnection of fuel cells may be facilitated by aligning the anode interconnections (and, therefore, also aligning the cathodes) of adjacent fuel cells. In an alternative embodiment shown in FIG. 12, adjacent fuel cells or the manufactured connection on adjacent fuel cells are staggered so that the cathodes 20 of one fuel cell are immediately adjacent to the anode interconnections 22 of the adjacent fuel cell. In this staggered orientation, serial electrical connections between interconnections 22 and cathodes 20 can easily be made using current collectors 30, which can also act as spacers. By choosing cells of different connection spacings, serial/parallel connections can be constructed with minimal manufacturing effort.

As shown in FIG. 5, when parallel and series connections are completed, a uniform bundle of, for example, four cells by four cells can be constructed to have the voltage of four fuel cells and the current of four fuel cells, with fuel required for all sixteen. A four by four bundle is used for example only. Bundles of varying sizes may also be created to obtain the desired voltage and current. It will be understood from the above that bundles having at least two fuel cells in each of two dimensions or axes may be formed.

In addition, it is possible to form bundles in this manner as a subset of a larger system. One bundle can be attached to a second bundle either by the same means within the bundle, or through use of interconnecting plates or wires that can be welded, crimped, sintered, or twisted.

Construction of a fuel cell bundle can utilize on-bench fixturing. Such fixturing can be easily duplicated or automated to allow for many such bundles to be constructed in parallel, minimizing production time. Fixtures may include the use of perforated sheet at the ends of the bundle weights to maintain the bundle placement, and side-wall constraints. The fixtures would allow the formation of a green unsintered bundle body, as well as the sintering and fixing of that body through temperature and or gas processing. Once formation of the green body and fixing of that body is complete, the bundle should be self-supporting, requiring only fixturing as might be needed in support of the fuel cell system requirements such as gas flow or power control. The bundle may be sintered prior to full system assembly, or may be sintered in situ, as processing would dictate.

Exemplary embodiments of the invention utilize 1.5 cm diameter anode-supported fuel cells with three anode interconnections each. However, similar methods and materials may be applied to any diameter with at least one discrete interconnection without substantive modification.

While exemplary embodiments of the invention have been described, it should be understood that the present invention is not limited to the exemplary embodiments. The present invention is not limited to anode-supported fuel cells, to tubular fuel cells, to any particular alignment of fuel cells, or to any particular way of making electrical connections between fuel cells. The present invention may be embodied in other specific forms without departing from the true scope of the invention. The described embodiments are to be considered in all respects only as illustrative and not restrictive.

What is claimed is:
1. A system comprising:
   a plurality of tubular fuel cells, each fuel cell comprising a single fuel cell having a length, each single fuel cell comprising:
      an inner electrode layer comprising an electrode extending continuously along the length of each fuel cell, an electrolyte layer coaxially surrounding the inner electrode layer, and
an outer electrode layer coaxially surrounding the electrolyte layer, the outer electrode layer comprising discrete outer electrodes spaced apart along the length of each fuel cell;
each single fuel cell further including a plurality of discrete electrical connection points spaced at discrete locations along said length of each fuel cell between adjacent ones of the outer electrodes and between discontinuities in the electrolyte layer, each electrical connection point including an interconnection band encompassing the circumference of the fuel cell and coaxially surrounding and in electrical communication with the inner electrode to enable electrical connection to the fuel cell at any angular rotation of the fuel cell; and
a current collector extending along the length of each fuel cell in electrical communication with the discrete outer electrodes and configured to directly connect electrical connection points of adjacent fuel cells to form a plurality of electrical connections directly between the discrete electrical connection points of adjacent fuel cells at the discrete locations, the current collector including a bridging connector in electrical communication with adjacent outer electrodes, the bridging connector electrically insulated from the interconnection.

2. A system according to claim 1, wherein the outer electrodes are cathodes, and wherein the inner electrode is an anode.

3. A system according to claim 1, wherein the plurality of electrical connection points includes at least one of serial or parallel electrical connections.

4. A system according to claim 1, wherein a plurality of the interconnection bands of at least one fuel cell having an inner anode are electrically connected to said anode and to at least one of an outer cathode or an anode interconnection band of at least one adjacent fuel cell.

5. A system according to claim 1, wherein the electrical connection points each include at least one of a wire, a clip, a weld, foam, ceramic, or a metallic form.

6. A system according to claim 1, wherein the fuel cells are anode-supported.

7. A system according to claim 4, wherein at least three interconnection bands of at least one fuel cell are each electrically connected to at least two outer cathodes of at least one adjacent fuel cell.

8. A system according to claim 4, wherein the fuel cells are anode-supported.

9. A system according to claim 4, wherein at least two outer cathodes on each fuel cell are electrically connected to each other.

10. A system according to claim 4, wherein:
the anode interconnection bands of each cell connect to outer cathodes of adjacent cells, and
the interconnections bands on adjacent cells are staggered such that outer cathodes of one cell are immediately adjacent to the anode interconnections bands of at least one adjacent cell.

11. A system according to claim 4, wherein:
each of said fuel cells has at least three electrical connection points, and
said system includes at least 16 fuel cells arranged as a bundle including at least two tubes in a first dimension and at least two tubes in a second dimension.

12. The system of claim 1 wherein said plurality of discrete electrical connection points are disposed on an outer surface of each of said plurality of fuel cells.

13. The system according to claim 1, wherein each of the electrical connections comprises one or more wires electrically connected to segments of each of the electrodes of one of the fuel cells and electrically coupled to corresponding wires electrically connected to segments of each of the electrodes of adjacent fuel cells.

14. A method of producing a fuel cell bundle, comprising:
providing a plurality of tubular fuel cells, each fuel cell comprising:
a single fuel cell having a length and comprising:
an inner electrode layer comprising an electrode extending continuously along the length of each fuel cell,
an electrolyte layer coaxially surrounding the inner electrode layer, and
an outer electrode layer coaxially surrounding the electrolyte layer, the outer electrode layer comprising discrete outer electrodes spaced apart along the length of each fuel cell;
a plurality of discrete electrical connection points spaced at discrete locations along the length of each fuel cell between adjacent ones of the outer electrodes and between discontinuities in the electrolyte layer, each electrical connection point including an interconnection band encompassing the circumference of the fuel cell and coaxially surrounding and in electrical communication with the inner electrode to enable electrical connection to the fuel cell at any angular rotation of the fuel cell, and
a current collector extending along the length of each fuel cell in electrical communication with the discrete outer electrodes and configured to directly connect electrical connection points on adjacent fuel cells, the current collector including a bridging connector in electrical communication with adjacent outer electrodes, the bridging connector electrically insulated from the interconnection; and
electrically interconnecting the plurality of fuel cells by making electrical connections directly between the spaced discrete electrical connection points disposed along said length of adjacent fuel cells at the discrete locations separated by a portion of the length of each fuel cell to enable electrical connection to the fuel cell at any circumferential position of the fuel cell.

15. A method according to claim 14, wherein the outer electrodes are cathodes and wherein the inner electrode is an anode.

16. A method according to claim 14, further comprising electrically interconnecting adjacent fuel cells using at least one current collector configured to directly connect electrical connection points of adjacent fuel cells.

17. A method according to claim 14, wherein the electrically interconnecting step includes the step of electrically connecting adjacent fuel cells serially, in parallel or as a combination thereof.

18. A method according to claim 14, further comprising:
electrically connecting a plurality of the interconnection bands of at least one fuel cell having an inner anode to said anode and to at least one of an outer cathode or an anode interconnection band of at least one adjacent fuel cell.

19. A method according to claim 14, wherein the electrically interconnecting step includes the step of electrically interconnecting discrete electrical connection points of adjacent fuel cells using at least one of a wire, a clip, a weld, foam, ceramic, or a metallic form.

20. A method according to claim 14, further comprising supporting the fuel cells by respective anodes.

21. A method according to claim 18, further comprising: electrically connecting each of at least three interconnection bands of at least one fuel cell to at least two outer cathodes of at least one adjacent cell.

22. A method according to claim 18, further comprising supporting the fuel cells by the respective anodes.

23. A method according to claim 18, wherein the electrically interconnecting step comprises electrically interconnecting a plurality of tubular fuel cells, said tubular fuel cells each having a plurality of outer cathodes of a cathode material layer, each outer cathode surrounding an electrolyte layer that surrounds the inner anode, and said electrolyte layer being discontinuous at locations where the interconnection bands are made to connect to the anode layer.

24. A method according to claim 23, further comprising the step of electrically connecting at least two outer cathodes on each fuel cell to each other.

25. A method according to claim 18, further comprising:
connecting anode interconnection bands of each cell to outer cathodes of adjacent cells, and
staggering the interconnection bands on adjacent cells such that outer cathodes of one cell are immediately adjacent to the anode interconnection bands of at least one adjacent cell.

26. A method according to claim 23, wherein the electrically interconnecting step comprises electrically interconnecting at least 16 tubular fuel cells arranged as a bundle including at least two tubes in a first dimension and at least two tubes in a second dimension, wherein each of said fuel cells has at least three electrical connection points.

27. A method according to claim 14 wherein said electrically interconnecting step comprises the step of electrically interconnecting a plurality of fuel cells each having a length by making electrical connections directly between spaced discrete electrical connection points disposed along said length and on an outer surface of adjacent fuel cells.

\* \* \* \* \*